United States Patent
Kim et al.

(10) Patent No.: US 10,585,330 B2
(45) Date of Patent: Mar. 10, 2020

(54) LIQUID CRYSTAL LIGHT DEFLECTOR AND HOLOGRAPHIC DISPLAY HAVING THE LIQUID CRYSTAL LIGHT DEFLECTOR

(71) Applicant: SAMSUNG ELECTRONICS CO., LTD., Suwon-si (KR)

(72) Inventors: Young Kim, Yongin-si (KR); Alexander V. Morozov, Moscow area (RU); Hoon Song, Yongin-si (KR); Kanghee Won, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 15/863,453

(22) Filed: Jan. 5, 2018

(65) Prior Publication Data
US 2019/0056635 A1 Feb. 21, 2019

(30) Foreign Application Priority Data

Aug. 16, 2017 (KR) ........................ 10-2017-0103716

(51) Int. Cl.
*G02F 1/31* (2006.01)
*G02B 27/22* (2018.01)
*G02F 1/1343* (2006.01)

(52) U.S. Cl.
CPC ........... *G02F 1/31* (2013.01); *G02B 27/2214* (2013.01); *G02B 27/2292* (2013.01); *G02F 2001/134381* (2013.01); *G02F 2201/128* (2013.01)

(58) Field of Classification Search
CPC .. G02F 1/31; G02F 2201/128; G02F 2201/30; G02F 2201/305;
(Continued)

(56) References Cited

U.S. PATENT DOCUMENTS 7,599,036 B2    10/2009   Ito
7,852,445 B2    12/2010   Uehara et al.
(Continued)

FOREIGN PATENT DOCUMENTS

JP          4051001 B2      2/2008
JP          4822535 B2      11/2011
(Continued)

OTHER PUBLICATIONS

U.S. Appl. No. 15/171,587, Young Kim, et al., filed Jun. 2, 2016.
(Continued)

*Primary Examiner* — Jessica M Merlin
(74) *Attorney, Agent, or Firm* — Sughrue Mion, PLLC

(57) ABSTRACT

A liquid crystal light deflector includes a first electrode layer including line electrodes, a second electrode layer including a common electrode, and a liquid crystal layer that forms an electrical prism using liquid crystal molecules according to an electric field formed between the first and second electrode layers. The orientations of the liquid crystal molecules may be reset by an electric field formed between line electrodes of adjacent channels within the first electrode layer. A method of deflecting light includes controlling the first electrode layer and the second electrode layer to reset the orientation of the liquid crystal molecules prior to forming an electrical prism in the liquid crystal layer.

18 Claims, 11 Drawing Sheets

(58) Field of Classification Search
CPC .... G02F 2001/134381; G02B 27/2228; G02B 5/18; G02B 27/2292; G02B 27/2214
See application file for complete search history.

(56) References Cited

U.S. PATENT DOCUMENTS

| | | | |
|---|---|---|---|
| 2014/0176671 A1* | 6/2014 | Choi | G03H 1/08 348/40 |
| 2015/0293409 A1* | 10/2015 | Usukura | G02F 1/1337 349/15 |
| 2016/0187851 A1* | 6/2016 | Park | G03H 1/2294 359/9 |
| 2017/0200423 A1* | 7/2017 | Kim | G09G 3/3433 |
| 2018/0032030 A1 | 2/2018 | Kim et al. | |
| 2018/0113370 A1* | 4/2018 | Zhao | G09G 3/3208 |
| 2018/0129105 A1* | 5/2018 | Kim | G02F 1/133345 |
| 2018/0292664 A1* | 10/2018 | Wang | G02B 27/2214 |
| 2019/0113802 A1* | 4/2019 | Won | G02F 1/133632 |
| 2019/0129257 A1* | 5/2019 | Wang | G02F 1/13306 |

FOREIGN PATENT DOCUMENTS

| | | |
|---|---|---|
| JP | 4952063 B2 | 6/2012 |
| JP | 2016-170263 A | 9/2016 |
| KR | 10-1189297 B1 | 10/2012 |
| KR | 10-2016-0001808 A | 1/2016 |
| KR | 10-2018-0052356 A | 5/2018 |

OTHER PUBLICATIONS

U.S. Appl. No. 15/809,569, Young Kim, et al., filed Nov. 10, 2017.
U.S. Appl. No. 15/391,298, Yunhee Kim, et al., filed Dec. 27, 2016.

* cited by examiner

LIQUID CRYSTAL LIGHT DEFLECTOR AND HOLOGRAPHIC DISPLAY HAVING THE LIQUID CRYSTAL LIGHT DEFLECTOR

CROSS-REFERENCE TO RELATED APPLICATION

This application claims priority from Korean Patent Application No. 10-2017-0103716, filed on Aug. 16, 2017, in the Korean Intellectual Property Office, the disclosure of which is incorporated herein in its entirety by reference.

BACKGROUND

1. Field

Apparatuses and methods consistent with exemplary embodiments relate to a liquid crystal light deflector, and a holographic display having the liquid crystal light deflector.

2. Description of the Related Art

Holographic display systems display a stereoscopic three-dimensional (3D) image by transforming a general image signal into a holographic image signal and providing a holographic image corresponding to the holographic image signal to both eyes of a user by using an optical system. A light deflector may be used to deflect the holographic image to the user's eyes. The light deflector may include a light deflection panel capable of changing the path of light based on an electrical signal. Examples of the light deflector include a microelectromechanical system (MEMS) scanner, a galvanic mirror, a linear spatial light modulator (SLM), and a liquid crystal light deflector. Of these light deflectors, a liquid crystal light deflector may be used as a small-sized light deflector.

SUMMARY

One or more exemplary embodiments may provide a liquid crystal light deflector and a holographic display having the liquid crystal light deflector.

According to an aspect of an exemplary embodiment, a liquid crystal light deflector includes a first electrode layer including line electrodes arranged side by side in a plurality of channels; a second electrode layer comprising a common electrode facing the first electrode layer; and a liquid crystal layer disposed between the first and second electrode layers, forming an electrical prism by rotation of orientations of the long diameters of liquid crystal molecules based on application of an electric field between the first and second electrode layers. The orientations of the liquid crystal molecules in the liquid crystal layer are reset by an electric field formed between line electrodes of adjacent channels within the first electrode layer, before a diffraction angle of the electrical prism is changed.

According to an aspect of another exemplary embodiment, a holographic display includes a liquid crystal light deflector including a first electrode layer including line electrodes arranged side by side in a plurality of channels, a second electrode layer comprising a common electrode facing the first electrode layer, and a liquid crystal layer disposed between the first and second electrode layers, forming an electrical prism by rotation of the orientations of the long diameters of liquid crystal molecules according to an electric field between the first and second electrode layers; and a control circuit configured to control voltages that are applied to the first electrode layer and the second electrode layer, wherein the orientations of the liquid crystal molecules in the liquid crystal layer are reset by an electric field formed between line electrodes of adjacent channels within the first electrode layer, before a diffraction angle of the electrical prism is changed.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Although widely used terminology has been selected for describing the exemplary embodiments in consideration of the functions thereof, these general terms may vary according to intentions of one of ordinary skill in the art, case precedents, the advent of new technologies, or the like. Terms arbitrarily selected by the applicant may also be used in a specific case. In this case, their meanings need to be given in the detailed description of the exemplary embodiments. Hence, the terms must be defined based on their meanings and the contents of the entire specification, not by simply stating the terms.

In descriptions of exemplary embodiments, when a portion is referred to as being connected to another portion, it may be directly connected to the other portion, or may be electrically connected to the other portion with other components interposed therebetween. The terms "comprises" and/or "comprising" or "includes" and/or "including" when used in this specification, specify the presence of stated elements, but do not preclude the presence or addition of one or more other elements.

The terms "configured" and "include" used herein should not be construed as necessarily including all components or steps written in the specification, but may include only some of the components or steps or may further include additional components or steps. Moreover, in the exemplary embodiments, when a layer is referred to as being "on" another layer or substrate, it can be directly on the other layer or substrate, or intervening layers may also be present.

The exemplary embodiments below should not be construed as restricting or limiting the right scope of the inventive concept. It is interpreted that matters which could be readily inferred by one of ordinary skill in the art to which the inventive concept pertains from the detailed description and the various embodiments belong to the scope of the inventive concept. Exemplary embodiments of the inventive concept will now be described more fully with reference to the accompanying drawings.

Figure 1:
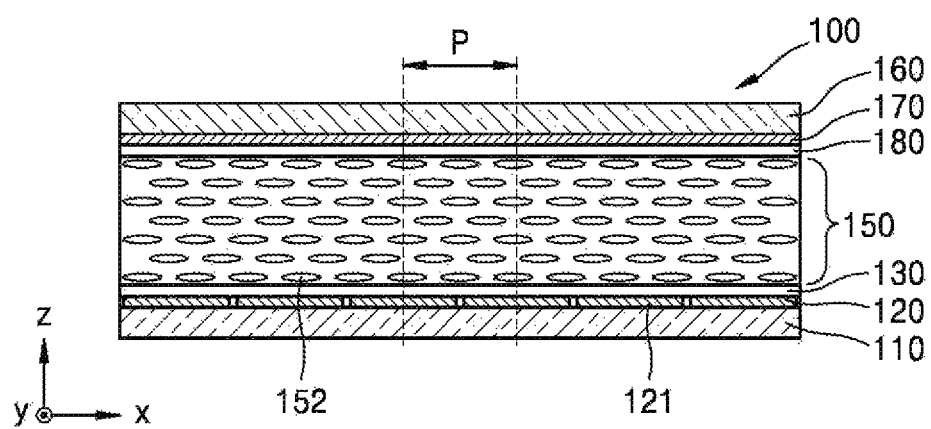
FIG. 1 is a cross-sectional view of a liquid crystal light deflector according to an exemplary embodiment.

FIG. 1 is a cross-sectional view of a liquid crystal light deflector 100 according to an exemplary embodiment.

Referring to FIG. 1, the liquid crystal light deflector 100 may include a first substrate 110 and a second substrate 160 disposed in parallel to each other and facing each other. A first electrode layer 120 is formed on the first substrate 110, and a second electrode layer 170 is formed on the second substrate 160. The first and second electrode layers 120 and 170 face each other. The first and second substrates 110 and 160 may be insulating substrates. The first and second substrates 110 and 160 may each include glass or plastic.

The first electrode layer 120 may include a plurality of line electrodes 121. The line electrodes 121 may be arranged in parallel. The line electrodes 121 may be arranged in a first direction (e.g., an x direction) with a constant pitch P therebetween. For example, the pitch P of the line electrodes 121 may be approximately 2 μm. As the pitch P is comparatively small, a light diffraction or deflection angle of the liquid crystal light deflector 100 may be increased. The line electrodes 121 may each have the same width. The width of each of the line electrodes 121 may be approximately 1.5 μm, and a length of each the line electrodes 121 may be approximately 14 mm, but exemplary embodiments are not limited thereto. In FIG. 1, 6 line electrodes 121 are depicted for convenience of explanation. However, exemplary embodiments are not limited thereto, and the first electrode layer 120 may include, for example, 720 line electrodes 121. In other words, the total number of line electrodes 121 may vary. Each of the line electrodes 121 extends in a second direction (e.g., the y direction).

The line electrodes 121 may include a transparent conductive material. For example, the line electrodes 121 may include indium-tin-oxide (ITO), indium-zinc-oxide (IZO), or indium-tin-zinc-oxide (ITZO).

The second electrode layer 170 is a common electrode for the line electrodes 121, and may be a flat-type electrode spaced apart from the first electrode layer 120 by a certain distance, and facing the first electrode layer 120. However, exemplary embodiments are not limited thereto. For example, the second electrode layer 170 may include a plurality of line electrodes, similar to the first electrode layer 120. However, in this case, the same floating voltage may be applied to each of the line electrodes 121 of the second electrode layer 170. The second electrode layer 170 may include a transparent conductive material, similar to that of the first electrode layer 120.

Figure 2:
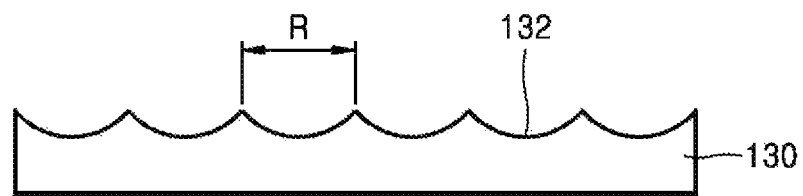
FIG. 2 is a side cross-sectional view schematically showing a structure of a first alignment layer of the liquid crystal light deflector of FIG. 1, according to an exemplary embodiment.

A first alignment layer 130, covering the first electrode layer 120, is disposed on the first substrate 110. FIG. 2 is a side cross-sectional view schematically showing a structure of the first alignment layer 130 of the liquid crystal light deflector 100 of FIG. 1, according to an exemplary embodiment. Concave portions 132 may be arranged on an upper surface of the first alignment layer 130 such that each of the concave portions 132 extends in the second direction (y direction) perpendicular to the first direction (x direction). The concave portions 132 are arranged such that their diameters R are perpendicular to the lengths of the line electrodes 121 of the first electrode layer 120. Each of the concave portions 132 may have a semi-circular shape and may have a diameter R of approximately several hundreds of nm.

A liquid crystal layer 150, including liquid crystal molecules 152, is arranged on the first alignment layer 130. Long diameters of the liquid crystal molecules 152 are aligned in the first direction (x direction). The liquid crystal molecules 152 may be aligned horizontally parallel to the first electrode layer 120, namely, in a horizontal direction (x-direction) in FIG. 1. The liquid crystal molecules 152 may be molecules having positive dielectric anisotropy, but exemplary embodiments are not limited thereto. Long diameters of the positive liquid crystal molecules 152 are aligned to be substantially perpendicular to a lengthwise direction of the line electrodes 121. When voltages are applied to the first and second electrode layers 120 and 170, respectively, an electric field (E-field) is formed within the liquid crystal layer 150 between the first electrode layer 120 and the second electrode layer 170. According to the intensity of the electric field, namely, a voltage difference between the applied voltages, the liquid crystal molecules 152 may be rotated to be perpendicular to the first substrate 110. Accordingly, a phase modulation may occur in light incident onto the first electrode layer 120.

The liquid crystal layer 150 forms an electrical prism because orientations of the long diameters of the liquid crystal molecules 152 are rotated according to the electric field formed between the first and second electrode layers 120 and 170. The liquid crystal layer 150 is disposed between the first electrode layer 120 and the second electrode layer 170.

A second alignment layer 180 may be formed between the liquid crystal layer 150 and the second electrode layer 170. Concave portions 132, like the concave portions 132 of the first alignment layer 130, may be formed on a surface of the second alignment layer 180 that contacts the liquid crystal layer 150. Like the concave portions 132 of the first alignment layer 130, each of the concave portions 132 of the second alignment layer 180 may also extend in the second direction (y direction). Diameters R of the concave portions 132 of the second alignment layer 180 may be substantially perpendicular to the lengths of the line electrodes 121 of the first electrode layer 120.

The first alignment layer 130 and the second alignment layer 180 may each include polyimide.

A plurality of spacer balls (not shown) may be disposed between the first alignment layer 130 and the second alignment layer 180. The spacer balls may each have a diameter in a range from about 2.5 μm to about 3 μm. The spacer balls maintain a constant distance between the first alignment layer 130 and the second alignment layer 180. The spacer balls may include a polymer material.

The liquid crystal light deflector 100 may use line electrodes 121 having a comparatively small widths, and therefore, the liquid crystal layer 150 may be thin, small, and slim.

Figure 3:
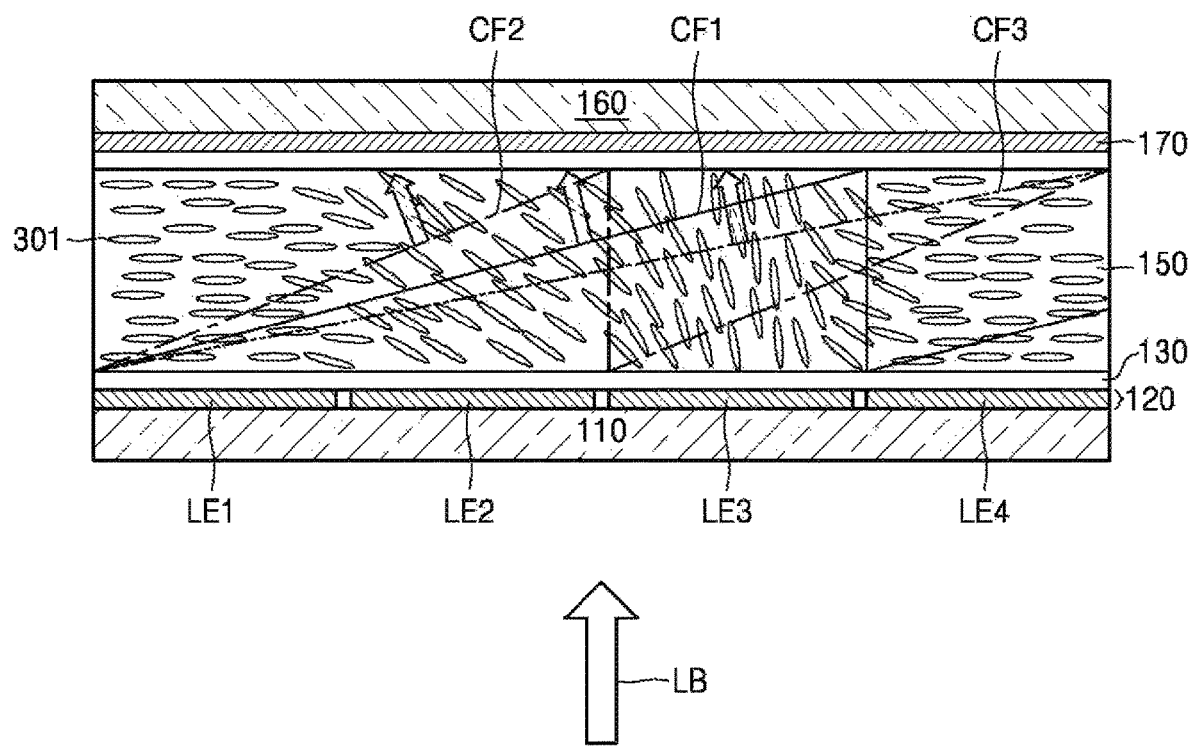
FIG. 3 is a schematic cross-sectional view for explaining an operation of a liquid crystal light deflector according to an exemplary embodiment.

FIG. 3 is a schematic cross-sectional view for explaining an operation of a liquid crystal light deflector according to an exemplary embodiment.

In FIG. 3, first through fourth line electrodes LE1 through LE4 of the liquid crystal light deflector 100 are depicted as disposed on the first substrate 110 for convenience of explanation. The first through fourth line electrodes LE1 through LE4 represent four consecutively disposed line electrodes 121 among the line electrodes 121 of FIG. 1. An electric field is formed in a region of the liquid crystal layer 150 between each of the first through fourth line electrodes LE1 through LE4 and the common electrode 170, due to a difference between voltages applied between each of the first through fourth line electrodes LE1 through LE4 and the common electrode 170. When voltages of the same size are applied to the common electrode 170 and the first line electrode LE1, liquid crystal molecules 301 may be arranged parallel to the concave portions 132 of the first substrate 110. In other words, because there is no difference between the voltages applied to the common electrode 170 and the first line electrode LE1 and thus no electric fields are formed, the liquid crystal molecules 301 do not move and the initial arrangement thereof may be maintained.

As the voltage applied to the line electrodes is increased, the direction of the long diameters of the liquid crystal molecules 301 may be rotated to be oriented perpendicular to the first substrate 110. The degree of rotation of the orientation may depend on the intensity of the electric field. When the intensity of the electric field is weak, the orientation of the long diameters of the liquid crystal molecules 301 rotates less. When the intensity of the electric field is strong, the orientation of the long diameters of the liquid crystal molecules 301 rotates more. When the intensity of the electric field reaches a maximum intensity, the liquid crystal molecules 301 may be arranged perpendicular to the first substrate 110. When a critical voltage is applied to the line electrodes, the intensity of the electric field may reach a maximum. The critical voltage may be, for example, 5 V. Referring to FIG. 3, it may be assumed that a critical voltage of 5 V was applied to the third line electrode LE3 and a voltage of 2.5 V was applied to the second line electrode LE2. Accordingly, liquid crystal molecules 301 arranged on the third line electrode LE3 may be rotated to be oriented substantially perpendicular to the first substrate 110, and liquid crystal molecules 301 arranged on the second line electrode LE2 may be rotated to be oriented at an oblique angle to the first substrate 110.

According to the electric field formed by the voltage applied to each of the first through fourth line electrodes LE1 through LE4, retardation of incident light may be induced, and accordingly, a phase of the light incident onto the liquid crystal layer 150 may be retarded. When the liquid crystal molecules 301 are arranged perpendicular to the first substrate 110, as a result of applying a critical voltage to a corresponding line electrode, the phase retardation of the light incident onto a region between the corresponding line electrode and the common electrode 170 may be $2\pi$.

As the voltage applied to the first through fourth line electrodes LE1 through LE4 is increased, the magnitude of retardation of light may be increased. Accordingly, an optical path conversion surface CF1 may be formed in the liquid crystal layer 150. In other words, a pseudo electrical prism may be formed. An arrangement of a plurality of such pseudo prisms may be repeated along the first direction (x direction) of the liquid crystal light deflector 100. The number (m number) of line electrodes 121 that form a single prism may vary according to the voltages applied to the line electrodes 121. For example, when 0 V and a critical voltage of 5 V are applied to two adjacent line electrodes 121, respectively, a single electrical prism may be formed per the two line electrodes 121. In FIG. 3, an optical path conversion surface CF2 is indicated by a one-dot-dashed line. Here, m is a natural number equal or greater than 2. It may be assumed that m line electrodes constitute a single unit electrode.

When multiple voltages, for example, 0 V, 5/3 V, 10/3 V, and 5 V, are applied to the first through fourth line electrodes LE1 through LE4, respectively, a single optical path conversion surface CF3 (one-dot-dashed line in FIG. 3) may be formed per the four pattern electrodes.

In other words, when voltages in a range from 0 V to the critical voltage (5 V) are applied to m line electrodes 121 at regular intervals, respectively, a single electrical prism may be formed on the liquid crystal layer 150.

A laser beam LB incident onto the first substrate 110 is refracted or diffracted at the optical path conversion surfaces CF1 through CF3 and is emitted. The laser beam LB may be one of red light, green light, and blue light. Diffraction angles or refractive indexes of the optical path conversion surfaces CF1 through CF3 may be controlled by controlling the voltages respectively applied to the first though fourth line electrodes LE1 through LE4, and thus, an emission angle of light passing through the liquid crystal layer 150 may be controlled. In other words, since the optical path of light is converted using the voltages respectively applied to the first though fourth line electrodes LE1 through LE4, the first though fourth line electrodes LE1 through LE4 may perform a light deflection function. When the light deflection function of the first though fourth line electrodes LE1 through LE4 is used, the red light, green light, and the blue light may all be emitted in the same direction.

Figure 4:
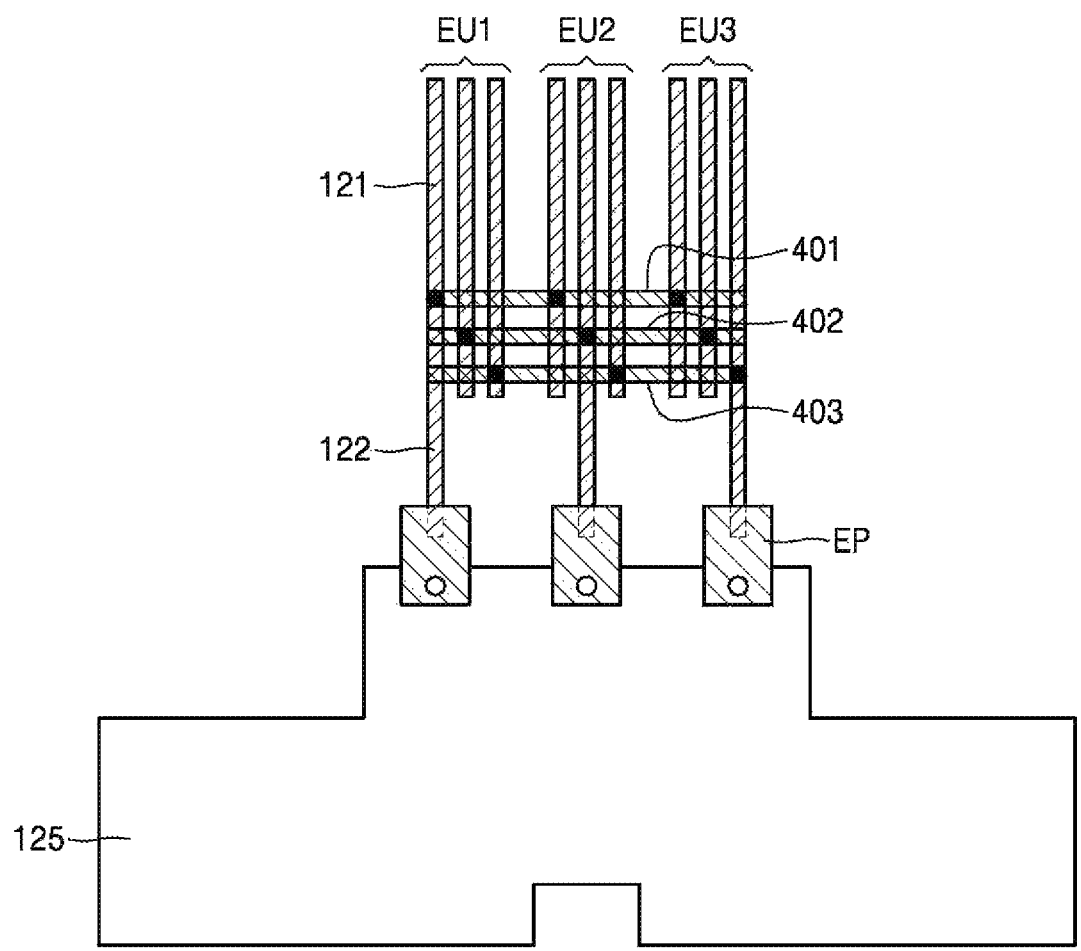
FIG. 4 is a plan view showing an arrangement of line electrodes of a first electrode layer of a liquid crystal light deflector according to an exemplary embodiment.

FIG. 4 is a plan view showing an arrangement of line electrodes 121 of the first electrode layer 120 of the liquid crystal light deflector 100 according to an exemplary embodiment.

Referring to FIG. 4, the first electrode layer 120 may include a plurality of line electrodes 121. The line electrodes 121 may be grouped into a plurality of, for example, 10, electrode units. Each of the electrode units may include 720 line electrodes. The 720 line electrodes may correspond to 720 channels of a driving integrated circuit (IC) used in a connected electronic device, for example, a holographic display. Alternatively, if a driving IC includes 1024 channels, each of the electrode units may include 1024 line electrodes.

In FIG. 4, for convenience of explanation, it is depicted that the first electrode layer 120 includes first through third electrode units EU1 through EU3, each including three line electrodes 121.

Respective ith line electrodes 121 of the first through third electrode units EU1 through EU3 are electrically connected to each other by an ith connection line 401. Three black circles connected to the ith connection line 401 indicate via metals that connect the ith line electrodes 121 to the ith connection line 401.

One of the line electrodes 121 connected to the ith connection line 401 may include an extension line 122 for connecting to the outside. For example, when the first electrode layer 120 includes 7200 line electrodes grouped into 10 electrode units, the first electrode layer 120 may include 720 extension units 122. In this case, a total of 720 extension units 122, including the extension units of the 1st, 11th, 21st, . . . , and 711th line electrodes 121 and the extension units of the 2nd, 22nd, 32nd, . . . , and 712th line electrodes 121 may be formed.

Each of the extension units 122 is connected to a corresponding electrode pad EP. For example, 720 electrode pads EP may be formed. The electrode pads EP may include a metal, for example, Mo.

The electrode pads EP are bonded to a driving IC 125. A voltage may be independently applied to 720 line electrodes 121 via the 720 electrode pads EP. In other words, a desired voltage may be applied to any of the 720 line electrodes 121 in each of the electrode units. Accordingly, light deflection may be performed by forming an electrical prism of a desired size (i.e., a desired diffraction angle) in each of the electrode units.

Figure 5:
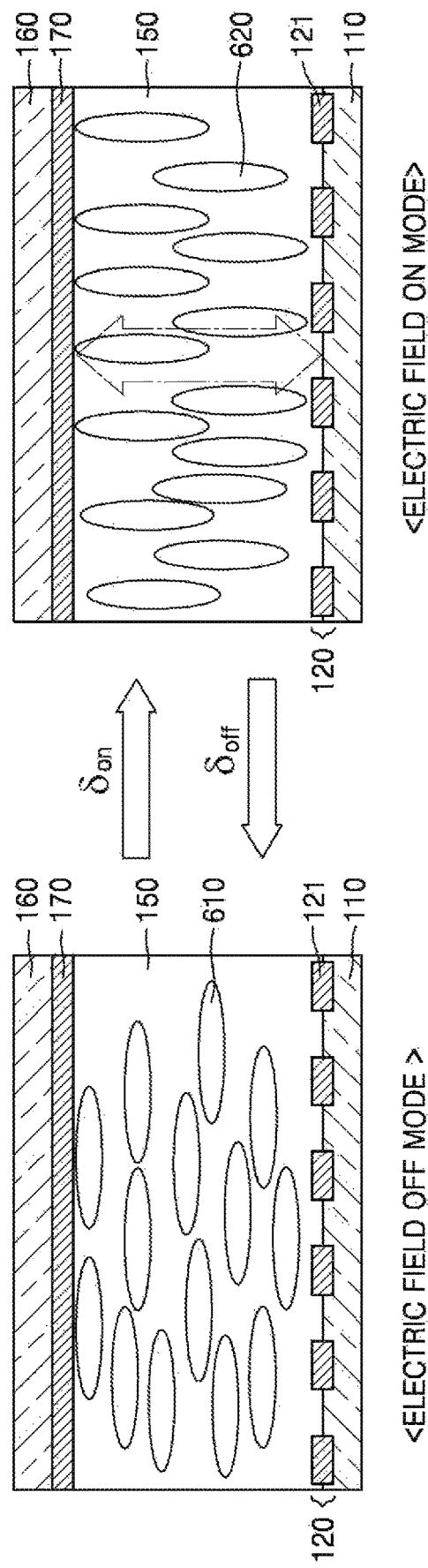
FIG. 5 illustrates cross-sectional views for explaining orientations of liquid crystal molecules within a liquid crystal layer in an electric field ON mode in which an electric field is formed and in an electric field OFF mode in which no electric fields are formed, according to an exemplary embodiment.

FIG. 5 illustrates cross-sectional views for explaining orientations of liquid crystal molecules within a liquid crystal layer in an electric field ON mode in which an electric field is formed and in an electric field OFF mode in which no electric fields are formed, according to an exemplary embodiment.

Referring to FIG. 5, to form an electrical prism of a desired diffraction angle, the liquid crystal light deflector 100 is switched from the electric field OFF mode to the electric field ON mode. In the electric field OFF mode, there are no voltage differences between the line electrodes of the first electrode layer 120 and the common electrode of the second electrode layer 170, and thus no electric fields are formed. In other words, in the electric field OFF mode, no electrical prisms are formed. On the other hand, in the electric field ON mode, as a voltage is applied to each of the line electrodes of the first electrode layer 120 and a floating voltage is applied to the common electrode of the second electrode layer 170, an electrical prism having a desired diffraction angle is formed within the liquid crystal layer 150.

In the electric field OFF mode, liquid crystal molecules 610 in the liquid crystal layer 150 are oriented horizontally, parallel to the first electrode layer 120. The liquid crystal molecules 610 in the liquid crystal layer 150 may have positive dielectric anisotropy as described above, but exemplary embodiments are not limited thereto. However, when a voltage is applied to each of the line electrodes 121 of the first electrode layer 120, an electric field is formed between each of the line electrodes 121 of the first electrode layer 120 and the common electrode of the second electrode layer 170, and thus orientations of the long diameters of liquid crystal molecules 620 are rotated. Accordingly, in the electric field ON mode, an electrical prism is formed in the liquid crystal layer 150. In FIG. 5, the liquid crystal molecules 620 are oriented vertically in the electric field ON mode. However, as described above with reference to FIG. 1 and the like, the liquid crystal molecules 620 may be rotated to be oriented at different angles according to the intensity of an electric field between each of the line electrodes and the common electrode in order to form an electrical prism of a desired diffraction angle.

When the electric field OFF mode is switched to the electric field ON mode to form an electrical prism, a liquid crystal (LC) movement velocity τon for rotating the orientation of liquid crystal molecules may be expressed as in Equation 1.

$$\tau_{on} \approx \frac{\gamma d^2}{\varepsilon_0 \varepsilon_a U^2} \quad \text{[Equation 1]}$$

where γ indicates viscosity, d indicates a thickness, ε0 indicates a dielectric constant, εa indicates dielectric anisotropy, and U indicates an electric field. In other words, when the electric field OFF mode is switched to the electric field ON mode, the LC movement velocity of the liquid crystal molecules depends on the intensity of the electric field that is formed. Accordingly, when the electric field OFF mode is switched to the electric field ON mode, an LC response time of the liquid crystal molecules may be relatively short.

However, in order to form an electrical prism of another diffraction angle after forming the electrical prism of the desired diffraction angle, the liquid crystal light deflector 100 may be switched from the electric field ON mode back to the electric field OFF mode. At this time, the liquid crystal molecules 620 oriented in the electric field ON mode may be rotated at an LC movement velocity τoff of Equation 2 to return to the initial orientations in the electric field OFF mode.

$$\tau_{off} \approx \frac{\gamma d^2}{\pi^2 K} \quad \text{[Equation 2]}$$

where γ indicates viscosity, d indicates a thickness, and K indicates an effective elastic constant. In contrast with the LC movement velocity τon of Equation 1, the LC movement velocity τoff when the electric field ON mode is switched to the electric field OFF mode is unrelated to the intensity of an electric field, because no electric fields are formed. Accordingly, the LC movement velocity τoff is lower than the LC movement velocity τon, and thus, when the electric field ON mode is switched to the electric field OFF mode, the liquid crystal molecules are slowly rotated. Therefore, for a fast operation (for example, a change in a diffraction angle) of the liquid crystal light deflector 100, the liquid crystal molecules need to be rotated within a relatively short LC response time (i.e., at a relatively high LC movement velocity). This will be described in detail with reference to FIGS. 8-11.

Figure 6A:
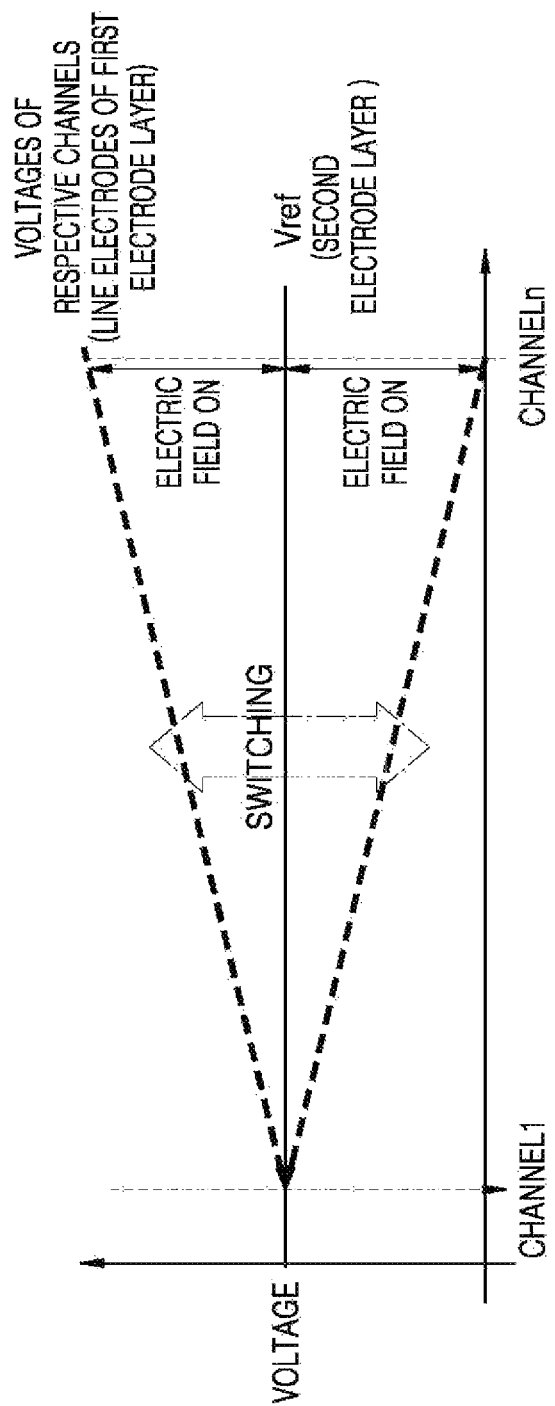
FIG. 6A is a graph for explaining voltages that are applied to the line electrodes of a first electrode layer and a common electrode of a second electrode layer in order to form an electrical prism, according to an exemplary embodiment.

FIG. 6A is a graph for explaining voltages that are applied to the line electrodes of a first electrode layer and a common electrode of a second electrode layer in order to form an electrical prism, according to an exemplary embodiment.

Referring to FIG. 6A, voltages are respectively applied to respective channels of the line electrodes 121 of the first electrode layer 120, and a voltage is applied to the common electrode of the second electrode layer 170, in order to form an electrical prism within the liquid crystal layer 150 of the liquid crystal light deflector 100.

In detail, a floating voltage Vref is applied to the common electrode of the second electrode layer 170, and voltages, of which magnitudes gradually increase in a direction from channel 1 to channel n, are applied to the line electrodes 121 of the channels 1 through n in the first electrode layer 120, respectively. For example, a voltage that is almost the same as the floating voltage Vref, applied to the common electrode, is applied to the line electrode of the channel 1, and a voltage closer to a critical voltage is applied in a direction toward the line electrode of the channel n. Accordingly, a stronger electric field may be formed around the line electrode of the channel n than around the line electrode of the channel 1. An electric field between each channel and the common electrode may be formed while switching between positive and negative with respect to the floating voltage Vref of the common electrode. This leads to preventing hardening of the liquid crystal molecules.

The descriptions provided with reference to FIG. 6A consequently relate to the voltages applied to the line electrodes and the common electrode in the electric field ON mode.

Figure 6B:
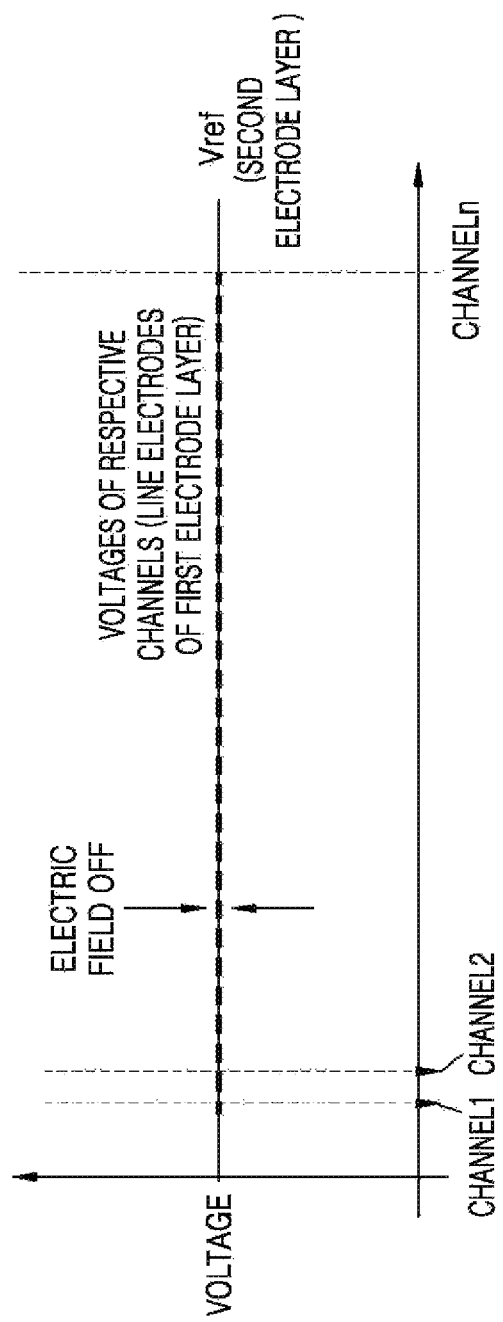
FIG. 6B is a graph for explaining voltages that are applied to the line electrodes of the first electrode layer and the common electrode of the second electrode layer in the electric field OFF mode, according to an exemplary embodiment.

FIG. 6B is a graph for explaining voltages that are applied to the line electrodes 121 of the first electrode layer 120 and the common electrode of the second electrode layer 170 in the electric field OFF mode, according to an exemplary embodiment.

Referring to FIG. 6B, in the electric field OFF mode, to prevent an electric field from being formed between the line electrodes 121 of the first electrode layer 120 and the common electrode of the second electrode layer 170, the floating voltage Vref may be applied to both the line electrodes 121 of the first electrode layer 120 and the common electrode of the second electrode layer 170.

Figure 7:
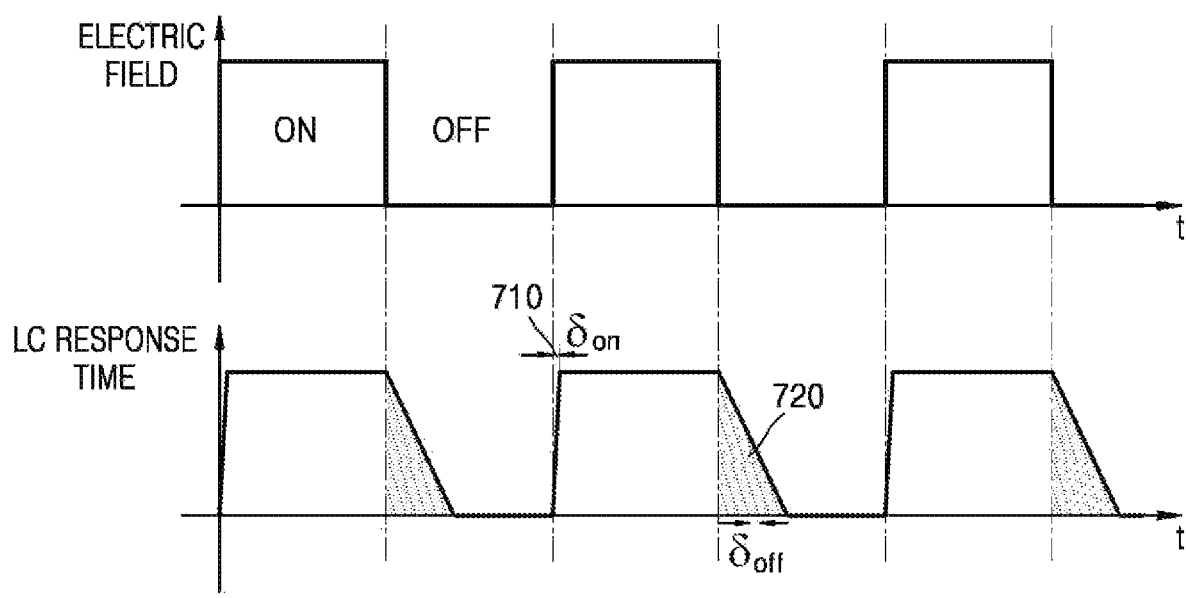
FIG. 7 is a timing diagram for explaining an LC response time according to switching between the electric field ON mode and the electric field OFF mode.

FIG. 7 is a timing diagram for explaining an LC response time according to switching between the electric field ON mode and the electric field OFF mode. When the individual voltages described above with reference to FIG. 6A are applied to the line electrodes 121 of the first electrode layer 120 in the electric field ON mode and then the floating voltage, described above with reference to FIG. 6B, is applied to the line electrodes 121 in the electric field OFF mode, the LC movement velocity of the liquid crystal molecules is slow as described above with reference to Equation 2. Accordingly, a long LC response time 720 may be required. An LC response time 710 necessary for setting orientation of the liquid crystal molecules in an electric field ON mode on is several tens of msec, whereas the LC response time 720 necessary for setting orientation of the liquid crystal molecules in an electric field OFF mode doff may reach a maximum of several seconds Therefore, this phenomenon may restrict an overall operational speed for a repetitive change in a diffraction angle of the liquid crystal light deflector 100.

Figure 8:
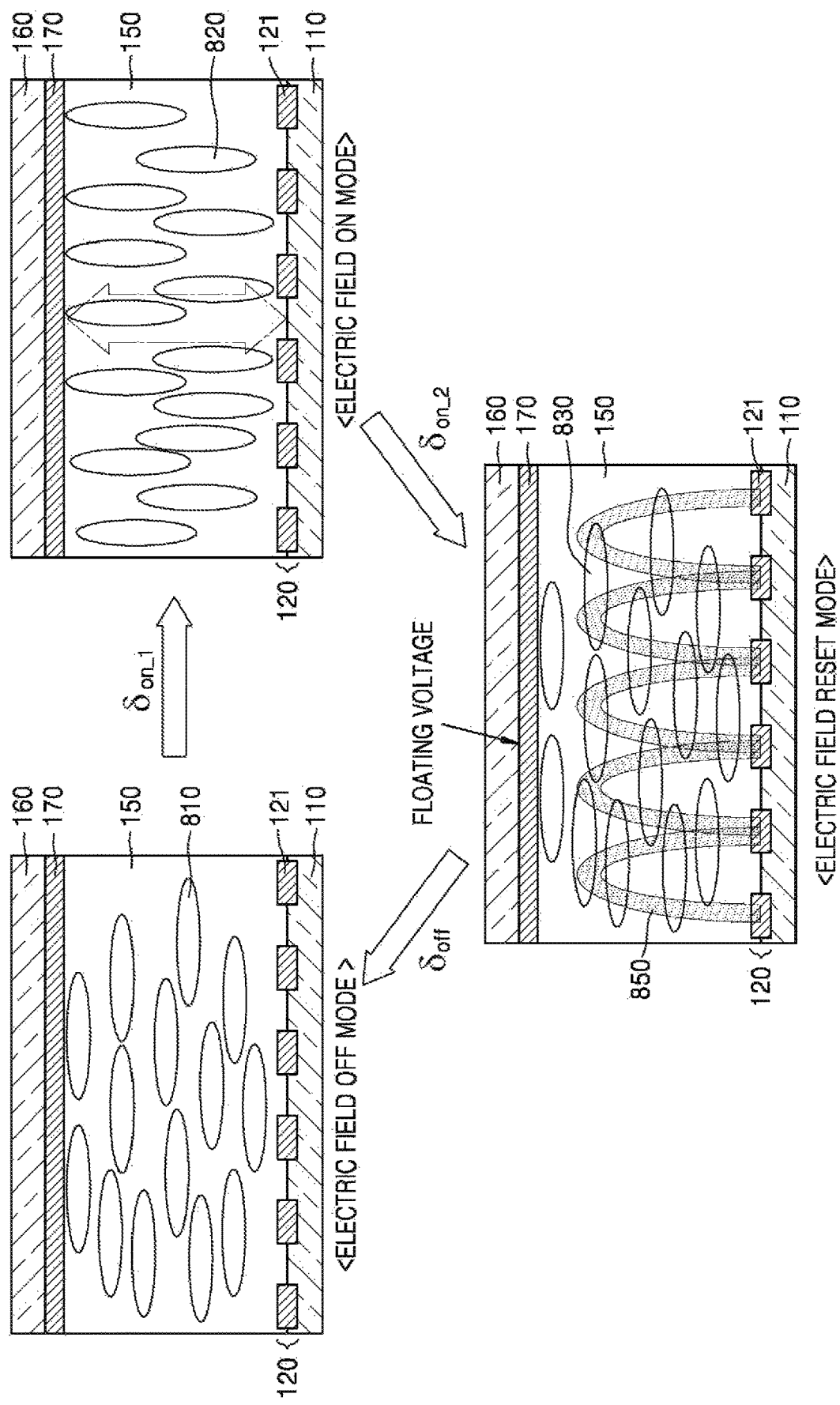
FIG. 8 is a view for explaining an electric field reset mode according to an exemplary embodiment.

FIG. 8 is a view for explaining an electric field reset mode according to an exemplary embodiment.

Referring to FIG. 8, the electric field reset mode is activated between the electric field ON mode and the electric field OFF mode, and is used to reduce the LC response time of the liquid crystal molecules when the electric field ON mode is switched to the electric field OFF mode.

To serve as an electrical prism having deflection of a specific diffraction angle, the liquid crystal light deflector 100 is switched from the electric field OFF mode doff to an electric field ON mode δon_1, and accordingly, orientations of liquid crystal molecules 810 are rotated to orientations of liquid crystal molecules 820.

Then, before the liquid crystal light deflector 100 is switched to an electrical prism having deflection of another specific diffraction angle, the orientations of the liquid crystal molecules 820 may be returned to the initial orientations of the liquid crystal molecules 810.

Before the diffraction angle of the electrical prism is changed, the orientations of the liquid crystal molecules may be reset by an electric field formed between line electrodes of adjacent channels within the first electrode layer 120 (i.e., a reset electric field 850). Resetting is a mode for returning the liquid crystal molecules 820 to orientations corresponding to a state in which no electric fields are formed between the electrode layers 120 and 170. The orientations corresponding to the state in which no electric fields are formed are the orientations of the liquid crystal molecules 810 horizontally parallel to the first electrode layer 120, namely, the initial orientations in the electric field OFF mode.

Before the liquid crystal light deflector 100 operates in the electric field OFF mode, the liquid crystal light deflector 100 activates an electric field reset mode δon_2 to form the reset electric field 850 for returning orientations of liquid crystal molecules 830 to the orientations of the liquid crystal molecules 810.

In the electric field reset mode δon_2, the orientations of liquid crystal molecules may be reset by applying the floating voltage of the second electrode layer 170 to the line electrode of one from among adjacent channels within the first electrode layer 120 and applying a first voltage different from the floating voltage to the line electrode of the other channel. Accordingly, the reset electric field 850, based on a difference between the floating voltage and the first voltage, may be formed between the line electrodes of the adjacent channels. The reset electric field 850, formed by the floating voltage and the first voltage respectively applied to the adjacent channels, may have an intensity that is equal to or approximates to the intensity of an electric field necessary for the liquid crystal molecules to be oriented perpendicular to the first electrode layer 120. Therefore, the first voltage may be, for example, the voltage (i.e., the critical voltage) applied to the channel n, which is the last channel, described above with reference to FIG. 6A, but exemplary embodiments are not limited thereto. In the electric field reset mode δon_2, a floating voltage (Vref of FIG. 6A) may be applied to the common electrode of the second electrode layer 170.

As described above, because the orientations of the liquid crystal molecules may be previously returned (reset) by the electric field reset mode δon_2 activated before the electric field OFF mode doff, an overall LC response time necessary for changing the diffraction angle of the liquid crystal light deflector 100 may be reduced.

Figure 9:
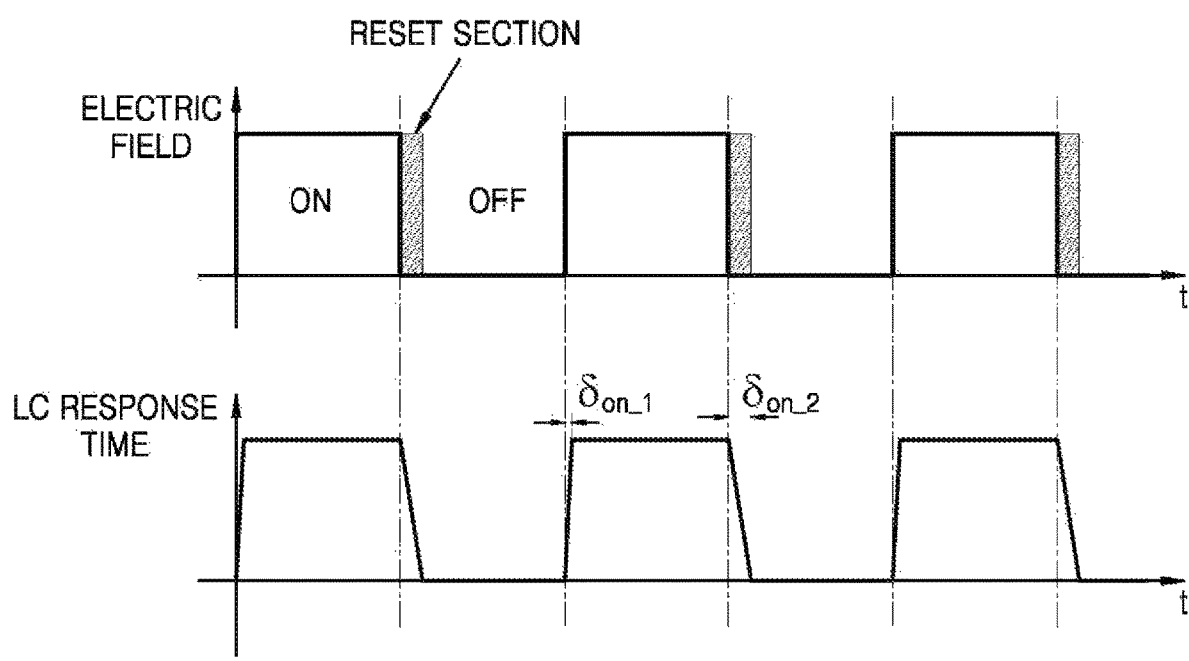
FIG. 9 is a timing diagram for explaining a variation in an LC response time according to an electric field reset mode according to an exemplary embodiment.

FIG. 9 is a timing diagram for explaining a variation in an LC response time according to an electric field reset mode according to an exemplary embodiment. Referring to FIG. 9, when the electric field reset mode δon_2 is activated right after the electric field ON mode δon_1 is terminated, an LC response time for returning to the orientations of the liquid crystal molecules in the electric field OFF mode doff is relatively much reduced compared with the timing diagram of FIG. 7. Accordingly, the liquid crystal light deflector 100 may realize a relatively fast change in a diffraction angle, namely, a relatively high response speed. In other words, the orientation of the liquid crystal molecules is forcedly rotated to the orientation when no electric fields are formed, via a reset section, and thus the LC response time of the liquid crystal molecules may be reduced.

Figure 10:
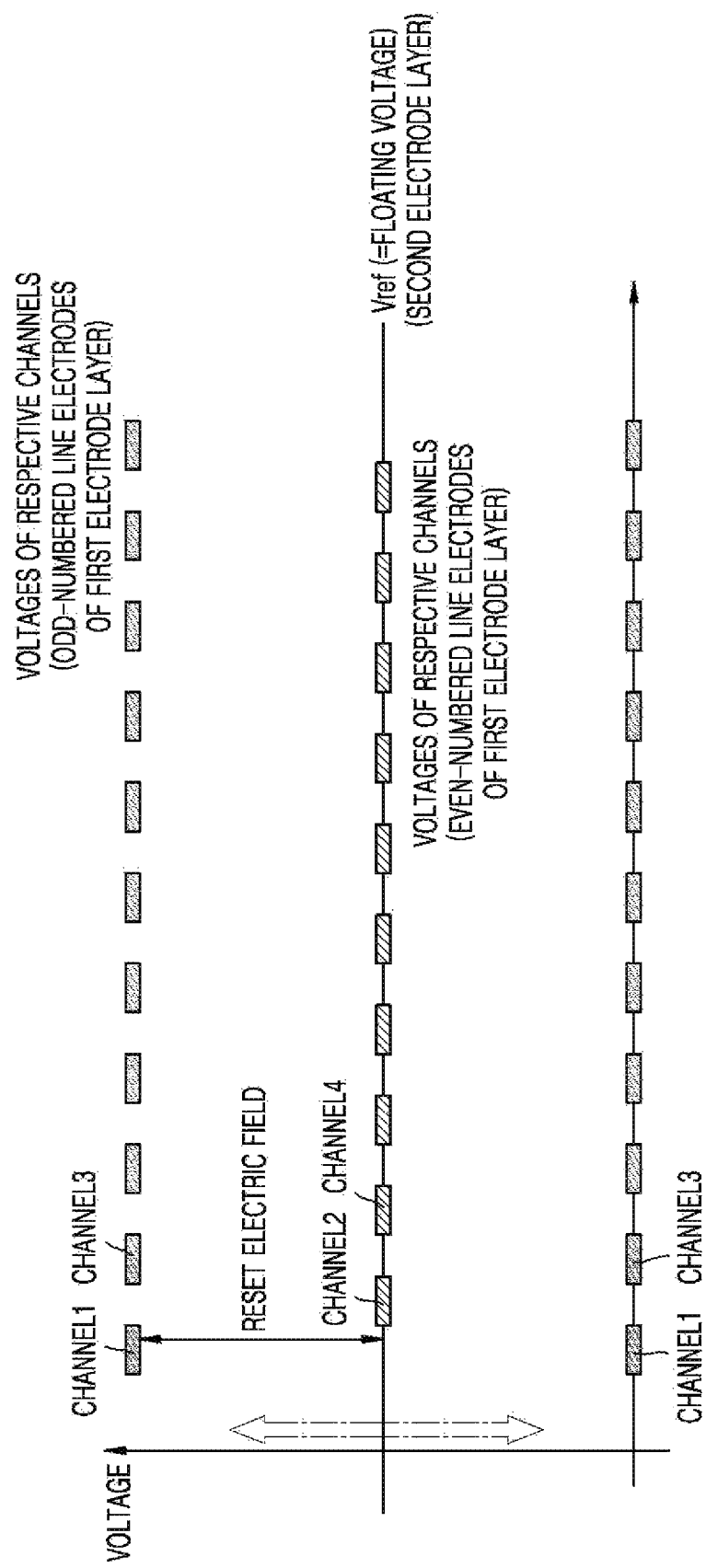
FIG. 10 is a graph for explaining voltages applied to a first electrode layer and a second electrode layer in order to form a reset electric field in the electric field reset mode, according to an exemplary embodiment.

FIG. 10 is a graph for explaining voltages applied to a first electrode layer and a second electrode layer in order to form a reset electric field in the electric field reset mode, according to an exemplary embodiment.

Referring to FIG. 10, in the electric field reset mode, a reset electric field may be formed between the line electrodes of adjacent channels in the first electrode layer 120. The adjacent channels may be the line electrodes of two adjacent channels in the first electrode layer 120. Alternatively, the adjacent channels may be two channels spaced apart from each other by a predetermined number of channels in the first electrode layer 120.

In more detail, a voltage that is the same as the floating voltage Vref applied to the common electrode of the second electrode layer 170 may be applied to each of even-numbered channels (channel 2, channel 4, . . . ) in the first electrode layer 120. In contrast, a critical voltage may be applied to each of odd-numbered channels (channel 1, channel 3, . . . ) in the first electrode layer 120. The critical voltage refers to a voltage to be applied to a line electrode of the first electrode layer 120 to form an electric field enabling the liquid crystal molecules of the liquid crystal layer 150 to have vertical orientations when the floating voltage Vref is applied to the common electrode of the second electrode layer 170, as described above. However, to form the reset electric field 850, a voltage having a similar magnitude to that of the critical voltage may be applied.

As such, as the critical voltage is applied to the odd-numbered channels and the floating voltage is applied to the even-numbered channels, the reset electric field 850 of FIG. 8 may be formed between an odd-numbered channel (for example, the channel 1) and an even-numbered channel (for example, the channel 2) that are adjacent to each other. Due to an influence of the reset electric field 850, the liquid crystal molecules in the liquid crystal layer 150 may be rotated to be oriented parallel to the first electrode layer 120. As described above, the reset electric field 850 may be formed alternating between a positive electric field and a negative electric field in order to prevent the liquid crystal molecules from hardening.

Although not shown in FIG. 10, the critical voltage and the floating voltage for forming the reset electric field 850 may be applied to two adjacent channels spaced apart from each other by a predetermined number of channels instead of an odd-numbered channel and an even-numbered channel. For example, the reset electric field 850 may be formed by applying the critical voltage to the channel 1 and applying the floating voltage to the channel 3, or the reset electric field 850 may be formed by applying the critical voltage to the channel 2 and applying the floating voltage to the channel 4. Furthermore, the reset electric field 850 may be formed by applying the critical voltage and the floating voltage to two channels farther spaced apart from each other. In other words, selection of the channels of two line electrodes for forming the reset electric field 850 is not limited to any method.

Figure 11:
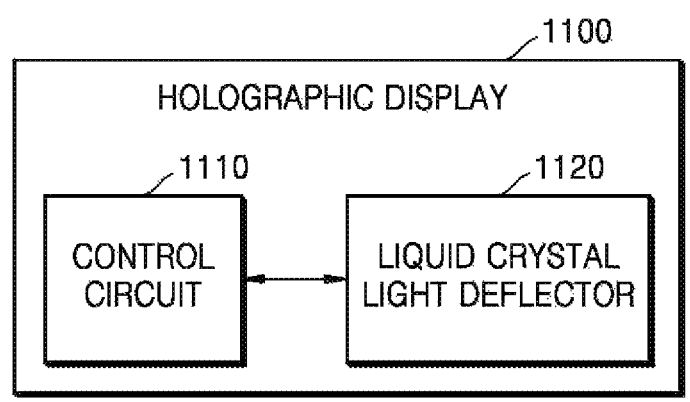
FIG. 11 is a block diagram of a hardware structure of a holographic display according to an exemplary embodiment.

FIG. 11 is a block diagram of a hardware structure of a holographic display 1100 according to an exemplary embodiment. Referring to FIG. 11, the holographic display 1100 may include a control circuit 1110 and a liquid crystal light deflector 1120. The holographic display 1100 of FIG. 11 is illustrated as including only components related to exemplary embodiments described herein. However, it may be understood by one of ordinary skill in the art that general-use components other than the components of FIG. 11 may be further included.

The holographic display 1100 may display a stereoscopic 3D image by providing a transformed holographic image to both eyes of a user by using an optical system. The holographic display 1100 may use the liquid crystal light deflector 1120 to deflect the holographic image to the user's eyes.

The liquid crystal light deflector 1120 includes a first electrode layer including line electrodes arranged side-by-side, a second electrode layer being a common electrode for the line electrodes and spaced apart from each other by a certain distance so as to face the first electrode layer, and a liquid crystal layer disposed between the first and second electrode layers to form an electrical prism due to rotation of the orientations of the long diameters of liquid crystal molecules according to an electric field formed between the first and second electrode layers. In other words, the liquid crystal light deflector 1120 corresponds to the above-described liquid crystal light deflector 100.

The control circuit 1110 controls voltages that are applied to the first electrode layer and the second electrode layer included in the liquid crystal light deflector 1120. The control circuit 1110 corresponds to hardware realized with at least one processor for controlling not only an operation of the liquid crystal light deflector 1120 but also all operations and functions of the holographic display 1100, and at least one memory.

The liquid crystal light deflector 1120 may form an electrical prism having any of various diffraction angles while the above-described electric field OFF mode, the above-described electric field ON mode, and the above-described electric field reset mode are being switched with each other. At this time, the orientations of the liquid crystal molecules in the liquid crystal layer of the liquid crystal light deflector 1120 may be reset by an electric field formed between line electrodes of adjacent channels within the first electrode layer, before the diffraction angle of the electrical prism is changed. To achieve resetting in the electric field reset mode, the control circuit 1110 may control a floating voltage of the second electrode layer to be applied to the line electrode of one of the adjacent channels and a first voltage (for example, a critical voltage) different from the floating voltage to be applied to the line electrode of the other channel. At this time, the control circuit 1110 may control the floating voltage to be applied to the second electrode layer while resetting is being performed.

While exemplary embodiments have been particularly shown and described, it will be understood by those skilled in the art that various changes in form and details may be made therein without departing from the spirit and scope of the inventive concept as defined by the appended claims. Therefore, exemplary embodiments should be considered in descriptive sense only and not for purposes of limitation. The scope of the inventive concept is defined not by the detailed description of the inventive concept but by the appended claims, and all differences within the scope will be construed as being included in the inventive concept.

What is claimed is:

1. A liquid crystal light deflector comprising:
   a first electrode layer comprising a plurality of line electrodes arranged side by side in a plurality of channels;
   a second electrode layer comprising a common electrode facing the first electrode layer;
   a liquid crystal layer disposed between the first electrode layer and the second electrode layer to form an electrical prism due to rotation of orientations of long diameters of liquid crystal molecules according to an electric field formed between the first electrode layer and the second electrode layer; and
   a processor configured to control voltages applied to the first electrode layer and the second electrode layer to reset the orientations of the liquid crystal molecules in the liquid crystal layer by forming an electric field between line electrodes of adjacent channels within the first electrode layer, before a diffraction angle of the electrical prism is changed.

2. The liquid crystal light deflector of claim 1, wherein the resetting is a mode for returning the liquid crystal molecules to orientations corresponding to a state where no electric fields are formed between the first electrode layer and the second electrode layer.

3. The liquid crystal light deflector of claim 2, wherein the orientations corresponding to the state where no electric fields are formed are the orientations of the liquid crystal molecules horizontally parallel to the first electrode layer.

4. The liquid crystal light deflector of claim 1, wherein the processor is further configured to control the voltages applied to the first electrode layer and the second electrode layer to reset the orientations of the liquid crystal molecules in the liquid crystal layer by applying a floating voltage of the second electrode layer to a line electrode of one of the adjacent channels within the first electrode layer and applying a first voltage different from the floating voltage to a line electrode of another channel.

5. The liquid crystal light deflector of claim 4, wherein the electric field formed between the floating voltage and the first voltage respectively applied to the adjacent channels has a same magnitude as a magnitude of an electric field necessary for the liquid crystal molecules to be oriented perpendicular to the first electrode layer.

6. The liquid crystal light deflector of claim 1, wherein the processor is further configured to control the voltages applied to the first electrode layer and the second electrode layer to reset the orientations of the liquid crystal molecules in the liquid crystal layer by applying a floating voltage to the second electrode layer while the resetting is being performed.

7. The liquid crystal light deflector of claim 1, wherein the liquid crystal layer comprises liquid crystal molecules having a positive-type dielectric anisotropy.

8. The liquid crystal light deflector of claim 1, wherein the adjacent channels are two adjacent channels in the first electrode layer or two channels spaced apart from each other by a predetermined number of channels in the first electrode layer.

9. A holographic display comprising:
a liquid crystal light deflector comprising:
a first electrode layer comprising a plurality of line electrodes arranged side by side in a plurality of channels,
a second electrode layer comprising a common electrode facing the first electrode layer, and
a liquid crystal layer disposed between the first electrode layer and the second electrode layer to form an electrical prism due to rotation of the orientations of the long diameters of liquid crystal molecules according to an electric field between the first electrode layer and the second electrode layer; and
a processor configured to control voltages applied to the first electrode layer and the second electrode layer to reset the orientations of the liquid crystal molecules in the liquid crystal layer by forming an electric field between line electrodes of adjacent channels within the first electrode layer, before a diffraction angle of the electrical prism is changed.

10. The holographic display of claim 9, wherein the resetting is a mode for returning the liquid crystal molecules to orientations corresponding to a state where no electric fields are formed between the first electrode layer and second electrode layer.

11. The holographic display of claim 10, wherein the orientations corresponding to the state where no electric fields are formed are the orientations of the liquid crystal molecules horizontally parallel to the first electrode layer.

12. The holographic display of claim 9, wherein, to perform the resetting, the processor is further configured to apply a floating voltage of the second electrode layer to a line electrode of one of the adjacent channels within the first electrode layer and to apply a first voltage different from the floating voltage to a line electrode of another channel.

13. The holographic display of claim 12, wherein the electric field formed between the floating voltage and the first voltage respectively applied to the adjacent channels has a same magnitude as a magnitude of an electric field necessary for the liquid crystal molecules to be oriented perpendicular to the first electrode layer.

14. The holographic display of claim 9, wherein the processor is further configured to apply a floating voltage to the second electrode layer during the reset operation.

15. The holographic display of claim 9, wherein the liquid crystal layer comprises liquid crystal molecules having a positive-type dielectric anisotropy.

16. The holographic display of claim 9, wherein the adjacent channels are two adjacent channels in the first electrode layer or two channels spaced apart from each other by a predetermined number of channels in the first electrode layer.

17. A method of controlling a liquid crystal light deflector comprising a liquid crystal layer disposed between a first electrode layer and a second electrode layer, the method comprising:
forming an electrical prism based on orientations of long diameters of liquid crystal molecules in the liquid crystal layer according to an electric field formed between the first electrode layer and the second electrode layer; and
resetting the orientations of the liquid crystal molecules in the liquid crystal layer by forming an electric field between line electrodes of adjacent channels within the first electrode layer, before a diffraction angle of the electrical prism is changed.

18. The method of claim 17, wherein the resetting operation comprises:
applying a floating voltage of the second electrode layer a line electrode of one of the adjacent channels within the first electrode layer and a first voltage different from the floating voltage to be applied to a line electrode of another channel.

* * * * *